(12) United States Patent
Raichelgauz et al.

(10) Patent No.: US 10,380,267 B2
(45) Date of Patent: Aug. 13, 2019

(54) SYSTEM AND METHOD FOR TAGGING MULTIMEDIA CONTENT ELEMENTS (71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(*) Notice: Subject to any disclaimer, the term of this patent is extended or adjusted under 35 U.S.C. 154(b) by 35 days.

(21) Appl. No.: 14/050,991

(22) Filed: Oct. 10, 2013

(65) Prior Publication Data

US 2014/0040232 A1 Feb. 6, 2014

Related U.S. Application Data

(63) Continuation-in-part of application No. 13/602,858, filed on Sep. 4, 2012, now Pat. No. 8,868,619, which
(Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 17/30* (2006.01)

(52) U.S. Cl.
CPC .. *G06F 17/30038* (2013.01); *G06F 17/30017* (2013.01); *G06F 17/30244* (2013.01);
(Continued)

(58) Field of Classification Search
CPC .......... G06Q 10/00; G06N 7/005; G06N 5/04; G06N 5/02; G06F 17/30858;
(Continued)

(56) References Cited

U.S. PATENT DOCUMENTS 4,733,353 A 3/1988 Jaswa
4,932,645 A 6/1990 Schorey et al.
(Continued)

FOREIGN PATENT DOCUMENTS

WO 02/31764 4/2002
WO 2003005242 A1 1/2003
(Continued)

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available Jul. 14, 2005.
(Continued)

*Primary Examiner* — Srirama Channavajjala (57) ABSTRACT

A method for tagging multimedia content elements is provided. The method comprises receiving at least one multimedia content element from a user device; generating at least one signature for the at least one multimedia content element; generating at least one tag based on the least one generated signature, wherein the at least one tag is searchable by the user device; and sending the tag generated for the received multimedia content element to storage on the user device.

18 Claims, 5 Drawing Sheets

Related U.S. Application Data is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, and a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 61/860,261, filed on Jul. 31, 2013.

(52) U.S. Cl.
CPC .. *G06F 17/30743* (2013.01); *G06F 17/30787* (2013.01); *G06F 17/30864* (2013.01)

(58) Field of Classification Search
CPC .......... G06F 17/3002; G06F 17/30023; G06F 17/30017; G06F 17/30038; G06F 17/30386; G06F 17/30787; G06F 17/30244; G06F 17/30743; G06F 17/30864
See application file for complete search history.

(56) References Cited

U.S. PATENT DOCUMENTS

| | | |
|---|---|---|
| 4,972,363 A | 11/1990 | Nguyen et al. |
| 5,214,746 A | 5/1993 | Fogel et al. |
| 5,307,451 A | 4/1994 | Clark |
| 5,568,181 A | 10/1996 | Greenwood et al. |
| 5,638,425 A | 6/1997 | Meador et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A * | 3/1999 | Takahashi ............ G06F 3/0481 348/E5.102 |
| 5,933,527 A | 8/1999 | Ishikawa |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,539,100 B1 | 3/2003 | Amir et al. |
| 6,550,018 B1 | 4/2003 | Abonamah et al. |
| 6,557,042 B1 | 4/2003 | He et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,816,857 B1 | 11/2004 | Weissman et al. |
| 6,819,797 B1 | 11/2004 | Smith et al. |
| 6,836,776 B2 | 12/2004 | Schreiber |
| 6,845,374 B1 * | 1/2005 | Oliver ............... G06F 17/30675 |
| 6,901,207 B1 | 5/2005 | Watkins |
| 6,938,025 B1 | 8/2005 | Lulich et al. |
| 6,963,659 B2 | 11/2005 | Tumey et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,248,300 B1 | 7/2007 | Ono |
| 7,260,564 B1 | 8/2007 | Lynn et al. |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,441,037 B2 | 10/2008 | Saxena |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,529,659 B2 | 5/2009 | Wold |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |

(56) References Cited

U.S. PATENT DOCUMENTS

| | | |
|---|---|---|
| 7,581,166 B2 | 8/2009 | Renger et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 * | 9/2012 | Raichelgauz ....... G06F 17/3002 707/803 |
| 8,312,031 B2 * | 11/2012 | Raichelgauz ....... G06F 17/3002 707/756 |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| 8,352,745 B2 | 1/2013 | McKeeth |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,856,051 B1 | 10/2014 | Song et al. |
| 8,868,619 B2 * | 10/2014 | Raichelgauz ....... G06F 17/3002 707/803 |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 * | 5/2015 | Raichelgauz ..... G06F 17/30023 707/737 |
| 9,087,049 B2 | 7/2015 | Raichelgauz et al. |
| 9,104,747 B2 | 8/2015 | Raichelgauz et al. |
| 9,111,134 B1 | 8/2015 | Rogers et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,466,068 B2 | 10/2016 | Raichelgauz et al. |
| 9,606,992 B2 | 3/2017 | Geisner et al. |
| 9,646,006 B2 | 5/2017 | Raichelgauz et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 * | 7/2002 | Smith ............... G06F 17/30017 |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0123713 A1 | 7/2003 | Geng |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 * | 6/2004 | Chuang ................ H04L 29/06 709/203 |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0264744 A1 | 12/2004 | Zhang et al. |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |

(56) References Cited

U.S. PATENT DOCUMENTS

| | | |
|---|---|---|
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0027844 A1 | 2/2007 | Toub et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172413 A1 | 7/2008 | Chiu |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0313140 A1* | 12/2008 | Pereira ............. G06F 17/30858 |
| 2008/0313146 A1 | 12/2008 | Wong et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0245603 A1 | 1/2009 | Koruga et al. |
| 2009/0037408 A1 | 2/2009 | Rodgers |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0220138 A1 | 9/2009 | Zhang et al. |
| 2009/0226930 A1 | 9/2009 | Roep et al. |
| 2009/0245573 A1 | 10/2009 | Saptharishi et al. |
| 2009/0253583 A1 | 10/2009 | Yoganathan |
| 2009/0259687 A1 | 10/2009 | Do et al. |
| 2009/0277322 A1 | 11/2009 | Cai et al. |
| 2009/0282218 A1 | 11/2009 | Raichelgauz et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0198626 A1 | 8/2010 | Cho et al. |
| 2010/0211565 A1 | 8/2010 | Lotito |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0164810 A1 | 7/2011 | Zang et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0197857 A1 | 8/2012 | Huang et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0315009 A1 | 12/2012 | Evans et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Arngren et al. |
| 2013/0311924 A1 | 11/2013 | Denker et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0154189 A1 | 6/2015 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |
| 2016/0239566 A1 | 8/2016 | Raichelgauz et al. |

FOREIGN PATENT DOCUMENTS

| | | |
|---|---|---|
| WO | 2003067467 A1 | 8/2003 |
| WO | 2004019527 A1 | 3/2004 |
| WO | 2005027457 A1 | 3/2005 |
| WO | 2007/0049282 | 5/2007 |

(56) References Cited

FOREIGN PATENT DOCUMENTS

| WO | 2014137337 A1 | 9/2014 |
|---|---|---|
| WO | 2016040376 A1 | 3/2016 |

OTHER PUBLICATIONS

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

IPO Examination Report under Section 18(3) for corresponding UK application No. GB1001219.3, dated Sep. 12, 2011.

International Search Report for the corresponding International Patent Application PCT/IL2006/001235; dated Nov. 2, 2008.

International Search Authority: "Written Opinion of the International Searching Authority" (PCT Rule 43bis.1) including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

Foote, Jonathan, et al. "Content-Based Retrieval of Music and Audio", 1997 Institute of Systems Science, National University of Singapore, Singapore (Abstract).

Ribert et al. "An Incremental Hierarchical Clustering", Visicon Interface 1999, pp. 586-591.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Mahdhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov, et al. "Specificity of Short Interfering RNA Determined through Gene Expression Signatures", PNAS, 2003, pp. 6347-6352.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

(56) References Cited

OTHER PUBLICATIONS

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
May et al., "The Transputer", Springer-Verlag, Berlin Heidelberg, 1989, teaches multiprocessing system.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Gomes et al., "Audio Watermaking and Fingerprinting: For Which Applications?" University of Rene Descartes, Paris, France, 2003.
Nam, et al., "Audio Visual Content-Based Violent Scene Characterization", Department of Electrical and Computer Engineering, Minneapolis, MN, 1998, pp. 353-357.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Brecheisen, et al., "Hierarchical Genre Classification for Large Music Collections", ICME 2006, pp. 1385-1388.
Chuan-Yu Cho, et al., "Efficient Motion-Vector-Based Video Search Using Query by Clip", 2004, IEEE, Taiwan, pp. 1-4.
Hua, et al., "Robust Video Signature Based on Ordinal Measure", Image Processing, 2004. 2004 International Conference on Image Processing (ICIP), vol. 1, IEEE, pp. 685-688, 2004.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Johnson, John L. "Pulse-Coupled Neural Nets: Translation, Rotation, Scale, Distortion, and Intensity Signal Invariance for Images." Applied Optics, vol. 33, No. 26, 1994, pp. 6239-6253.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Santos, et al., "SCORM-MPEG: an Ontology of Interoperable Metadata for Multimedia and e-Learning", 2015 23rd International Conference on Software, Telecommunications and Computer Networks (SoftCOM) Year 2015, pp. 224-228, DOI: 10.1109/SOFTCOM.2015.7314122 IEEE Conference Publications.
Schneider, et. al., "A Robust Content Based Digital Signature for Image Authentication", Proc. ICIP 1996, Laussane, Switzerland, Oct. 1996, pp. 227-230.
Shih-Fu Chang, et al., "VideoQ: A Fully Automated Video Retrieval System Using Motion Sketches", 1998, IEEE, , New York, pp. 1-2.
Stewart, et al., "Independent Component Representations for Face Recognition", Proceedings of the SPIE Symposium on Electronic Imaging III, San Jose, California, Jan. 1998, pp. 1-12.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Wei-Te Li et al., "Exploring Visual and Motion Saliency for Automatic Video Object Extraction", IEEE, vol. 22, No. 7, Jul. 2013, pp. 1-11.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Yanagawa, et al., "Columbia University's Baseline Detectors for 374 LSCOM Semantic Visual Concepts." Columbia University ADVENT technical report, 2007, pp. 222-2006-8.
Zou, et al., "A Content-Based Image Authentication System with Lossless Data Hiding", ICME 2003, pp. 213-216.
Zhu et al., "Technology-Assisted Dietary Assesment", Proc SPIE. Mar. 20, 2008, pp. 1-15.
Hogue, "Tree Pattern Inference and Matching for Wrapper Induction on the World Wide Web", Master's Thesis, Massachusetts institute of Technology, 2004, pp. 1-106.
Marian Stewart Bet al., "Independent component representations for face recognition", Proceedings of the SPIE Symposium on Electronic Imaging: Science and Technology; Conference on Human Vision and Electronic Imaging ,iii Jose, California, Jan., 1998, pp. 1-12.
Vallet et al., "Personalized Content Retrieval in Context Using Ontological Knowledge", IEEE Transactions on Circuits and Systems for Video Technology, vol. 17, No. 3, March 2007. pp. 336-346.
Li et al., "Matching Commercial Clips from TV Streams Using a Unigue, Robust and Compact Signature", IEEE 2005, pp. 1-8.
Big Bang Theory Series 04 Episode 12, aired Jan. 6, 2011; [retrieved from Internet: <https://bigbangtrans.wordpress.com/series-4-episode-12-the-bus-pants-utilization/>].
Wang et al., "Classifying Objectionable Websites Based onlmage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

(56) References Cited

OTHER PUBLICATIONS

Ortiz-Boyer et al, "CIXL2: A Crossover Operator for Evolutionary Algorithms Based on Population Features", Journal of ArtificialIntelligence Research 24 (2005) Submitted Nov. 2004; published Jul. 2005, pp. 1-48.
Scheper et al, "Nonlinear dynamics in neural computation", ESANN'2006 proceedings—European Symposium on Artificial Neural Networks, Bruges (Belgium), Apr. 26-28 2006, d-side publication, ISBN 2-930307-06-4, pp. 1-12.
Lyon, "Computational Models of Neural Auditory Processing", IEEE International Conference on Acoustics, Speech, and Signal Processing, ICASSP '84, Date of Conference: Mar. 1984, vol.: 9, pp. 41-44.
Boari et al, "Adaptive Routing for Dynamic Applications in Massively Parallel Architectures", 1995 IEEE, Spring 1995, pp 1-14.
Cernansky et al, "Feed-forward Echo State Networks", Proceedings of International Joint Conference on Neural Networks, Montreal, Canada, Jul. 31-Aug. 4, 2005, pp. 1-4.
Fathy et al, "A Parallel Design and Implementation for Backpropagation Neural Network Using MIMD Architecture", 8th Mediterranean Electrotechnical Conference, 19'96. MELECON '96, Date of Conference: May 13-16 1996, vol.: 3 Pages 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Howlett et al, "A Multi-Computer Neural Network Architecture in a Virtual Sensor System Application", International journal of knowledge-based intelligent engineering systems, 4 (2). pp. 86-93, I33N 1327-2314.
May et al, "The Transputer", Springer-Verlag Berlin Heidelberg 1989, vol. 41.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Whitby-Strevens, "The transputer", 1985 IEEE, pp. 292-300.
Zhou et al, "Ensembling neural networks: Many could be better than all", National Laboratory for Novel Software Technology, Nanjing University, Hankou Road 22, Nanjing 210093, PR China Received Nov. 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol.: 7, Issue: 1, Mar. 2003, pp. 37-42.
Hua et al., "Robust Video Signature Based on Ordinal Measure", International Conference on Image Proceesing (ICIP), 2004 IEEE, pp. 685-688.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Lu et al, "Structural Digital Signature for Image Authentication: An Incidental Distortion Resistant Scheme", IEEE Transactions on Multimedia, vol. 5, No. 2, Jun. 2003, pp. 161-173.

* cited by examiner

SYSTEM AND METHOD FOR TAGGING MULTIMEDIA CONTENT ELEMENTS

CROSS-REFERENCE TO RELATED APPLICATIONS

This application claims the benefit of U.S. provisional application 61/860,261 filed on Jul. 31, 2013. This application is a continuation-in-part (CIP) of U.S. patent application Ser. No. 13/602,858 filed Sep. 4, 2012, now issued as U.S. Pat. No. 8,868,619, which is a continuation of U.S. patent application Ser. No. 12/603,123, filed on Oct. 21, 2009, now issued as U.S. Pat. No. 8,266,185, which is a continuation-in-part of:

(1) U.S. patent application Ser. No. 12/084,150 having a filing date of Apr. 7, 2009, now issued as U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now issued as U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, now pending, which is a CIP of U.S. patent application Ser. No. 12/084,150, having a filing date of Apr. 7, 2009 and U.S. patent application Ser. No. 12/195,863 filed on Aug. 21, 2008; and (4) U.S. patent application Ser. No. 12/538,495, filed Aug. 10, 2009, now issued as U.S. Pat. No. 8,312,031, which is a CIP of U.S. patent application Ser. No. 12/084,150 having a filing date of Apr. 7, 2009, U.S. patent application Ser. No. 12/195,863, filed on Aug. 21, 2008; and U.S. patent application Ser. No. 12/348,888, filed Jan. 5, 2009. All of the applications referenced above are herein incorporated by reference for all that they contain.

TECHNICAL FIELD

The present invention relates generally to the analysis of multimedia content displayed in a web-page, and more specifically to a system and methods for enhancing a user's search experience for multimedia content that exists on a user device.

BACKGROUND

Search engines are used for searching for information over the World Wide Web. Search engines are also utilized to search locally over the user device. A search query refers to a query that a user enters into such a search engine in order to receive search results. The search query may be in a form of a textual query, an image, or an audio query.

Searching for multimedia content elements (e.g., picture, video clips, audio clips, etc.) stored locally on the user device as well as on the web may not be an easy task. According to the prior art solutions, respective of an input query a search is performed through the metadata of the available multimedia content elements. The metadata is typically associated with a multimedia content element and includes parameters, such as the element's size, type, name, and short description, and so on. The description and name of the element are typically provided by the creator of the element and by a person saving or placing the element in a local device and/or a website. Therefore, metadata of an element, in most cases, is not sufficiently descriptive of the multimedia element. For example, a user may save a picture of a cat under the file name of "weekend fun", thus the metadata would not be descriptive of the contents of the picture.

As a result, searching for multimedia content elements based solely on their metadata may not provide the most accurate results. Following the above example, the input query 'cat' would not return the picture saved under "weekend fun". In computer science, a tag is a non-hierarchical keyword or term assigned to a piece of information, such as multimedia content elements.

Tagging has gained wide popularity due to the growth of social networking, photograph sharing, and bookmarking of websites. Some websites allow users to create and manage tags that categorize content using simple keywords. The users of such sites manually add and define the description of the tags. However, some websites limit the tagging options of multimedia elements, for example, by only allowing tagging of people shown in a picture. Therefore, searching for all multimedia content elements solely based on the tags would not be efficient.

It would be therefore advantageous to provide a solution that overcomes the deficiencies of the prior art by providing search results respective of the contents of the multimedia elements. It should be further advantageous to provide a solution for automatically tagging multimedia elements based on their contents.

SUMMARY

Certain embodiments disclosed herein include a system and method tagging multimedia content elements. The method comprises receiving at least one multimedia content element from a user device; generating at least one signature for the at least one multimedia content element; generating at least one tag based on the least one generated signature, wherein the at least one tag is searchable by the user device; and sending the tag generated for the received multimedia content element to storage on the user device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The certain disclosed embodiments provide a system and a method for enhancing and enriching users' experience while navigating through multimedia content sources that exist on a user device. In an embodiment, the system is configured to receive multimedia content elements from the user device. The system is further configured to analyze the multimedia content elements and generate one or more signatures respective thereto. Based on the generated signatures at least one tag is provided which includes descriptive information about the contents of the multimedia elements. The generated tags are searchable. The system is configured to store the multimedia content elements together with their respective tags in a data storage unit accessible by the user device, a search engine, and so on. In one embodiment, upon receiving a query or a portion thereof from a user, the system is configured to search through the data storage unit for tags related to the user's query and provide the multimedia content elements respective of the tags associated thereto.

Figure 1:
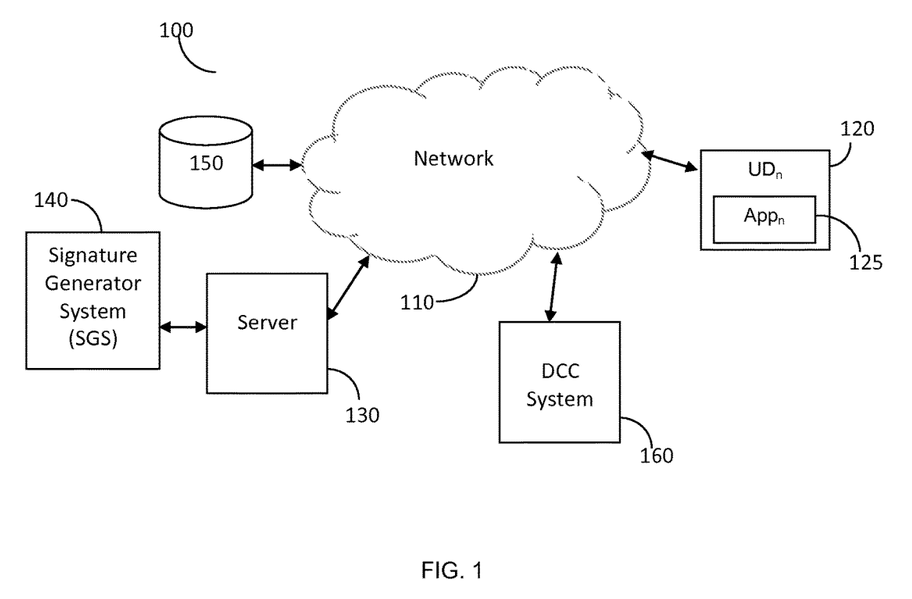
FIG. 1 is a schematic block diagram of a network system utilized to describe the various embodiments disclosed herein.

FIG. 1 shows an exemplary and non-limiting schematic diagram of a network system 100 utilized to describe the various embodiments disclosed herein. A network 110 is used to communicate between different parts of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 is a user device 120. A user device 120 may be, for example, a personal computer (PC), a personal digital assistant (PDA), a mobile phone, a smart phone, a tablet computer, an electronic wearable device (e.g., glasses, a watch, etc.), and other kinds of wired and mobile appliances, equipped with browsing, viewing, capturing, storing, listening, filtering, and managing capabilities enabled as further discussed herein below.

The user device 120 may further include a software application (App) 125 installed thereon. A software application App 125 may be downloaded from an application repository, such as the AppStore®, Google Play®, or any repositories hosting software applications. The application 125 may be pre-installed in the user device 120. In one embodiment, the application 125 is a web-browser. It should be noted that only one user device 120 and one application 125 are discussed with reference to FIG. 1 merely for the sake of simplicity. However, the embodiments disclosed herein are applicable to a plurality of user devices that can access the server 130 and multiple applications installed thereon.

Also communicatively connected to the network 110 is a data warehouse 150 that stores multimedia content elements, tags related to the multimedia content elements, and so on. In the embodiment illustrated in FIG. 1, a server 130 communicatively communicates with the data warehouse 150 through the network 110. In other non-limiting configurations, the server 130 is directly connected to the data warehouse 150.

The system 100 shown in FIG. 1 includes a signature generator system (SGS) 140 and a deep-content classification (DCC) system 160 which are utilized by the server 130 to perform the various disclosed embodiments. The SGS 140 and the DCC system 160 may be connected to the server 130 directly or through the network 110. In certain configurations, the DCC system 160 and the SGS 140 may be embedded in the server 130. It should be noted that the server 130 typically comprises a processing unit and a memory (not shown). The processor is coupled to the memory, which is configured to contain instructions that can be executed by the processing unit. The server 130 also includes a network interface (not shown) to the network 110. In one embodiment the server 130 is commutatively connected or includes an array of Computational Cores configured as discussed in more detail below.

The server 130 is configured to receive and serve multimedia content elements. This includes, but is not limited to, generating at least one tag for each received multimedia content element, saving the received elements and their associated tags in the data warehouse 150 and/or the user device 120, and searching for multimedia elements using the assigned tags responsive of an input query. The tag is a textual index term assigned to certain content. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

Specifically, according to the disclosed embodiments, the server 130 is configured to receive multimedia content elements from the user device 120 accompanied by a request to tag the elements. With this aim, the server 130 sends each received multimedia content element to the SGS 140 and/or DCC system 160. The decision which is used (e.g., the SGS 140 and/or DCC system 160) may be a default configuration or the results by each approach.

In an embodiment, the SGS 140 receives a multimedia content element and returns at least one signature respective thereto. The generated signature(s) may be robust to noise and distortion. The process for generating the signatures is discussed in detail below.

Then, using the generated signature(s), the server 130 is configured to search for similar multimedia content elements in the data warehouse 150. The process of matching between multimedia content elements is discussed in detail below with respect to FIGS. 4 and 5.

Upon identification of similar multimedia content elements, the server 130 is configured to extract tags associated with the identified elements and assigned such tags to the received multimedia content elements. It should be noted that if multiple tags are found matching, the server 130 may correlate between the tags or select tags that are most descriptive or strongly related to the received element. Such determination may be achieved by selecting tags associated with multimedia content elements such that their respective signatures match the input element over a predefined threshold.

According to another embodiment, the tag for a received multimedia content element is determined based on a concept structure (or concept). A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures are also described in U.S. Pat. No. 8,266,185 (hereinafter '185) to Raichelgauz et al., which is assigned to common assignee, and is incorporated hereby by reference for all that it contains.

According to this embodiment, a query is sent to the DCC system 160 to match a received content element of at least one concept structure. If such a match is found, then the metadata of the concept structure is used to tag the received content element. The identification of a concept matching the received multimedia content element includes matching at least one signature generated for the received element (such signature(s) may be produced either by the SGS 140 or the DCC system 160) and comparing the element's signatures to signatures representing a concept structure. The matching can be performed across all concept structures maintained by the system DCC 160.

It should be noted that if the query sent to the DCC system 160 returns multiple concept structures, a correlation for matching concept structures is performed to generate a tag that best describes the element. The correlation can be achieved by identifying a ratio between signatures' sizes, a spatial location of each signature, and using the probabilistic models.

The one or more tags are assigned to each of the multimedia content elements returned to the user device 120. In addition, the server 130 may save each of the received elements and their respective tags in the storage device. As a non-liming example, if the multimedia content element received is a picture in which a dog, a human and a ball are shown, signatures are generated respective of these objects (i.e., the dog, the human, and the ball). Based on the signatures, one or more tags are generated by the server 130 and assigned to the multimedia content element. Because the tag is generated respective of the contents of the picture, the tags may be "dog lovers", "man plays with his dog", a similarly descriptive tag.

In another embodiment, the multimedia content elements can be searched using the generated tags, either locally in the user device 120 or remotely in the data warehouse 150. Upon receiving a query or a portion thereof from a user, the search returns one or more multimedia content elements respective of the correlation of the query and the elements' tags. It should be noted that when a local search is performed, for example, by means of the application 125, no connection to the network 110 is required.

It should further be noted that the signatures generated for multimedia content elements would enable accurate tagging of the elements, because the signatures generated for the multimedia content elements, according to the disclosed embodiments, allow for recognition and classification of multimedia content.

Figure 2:
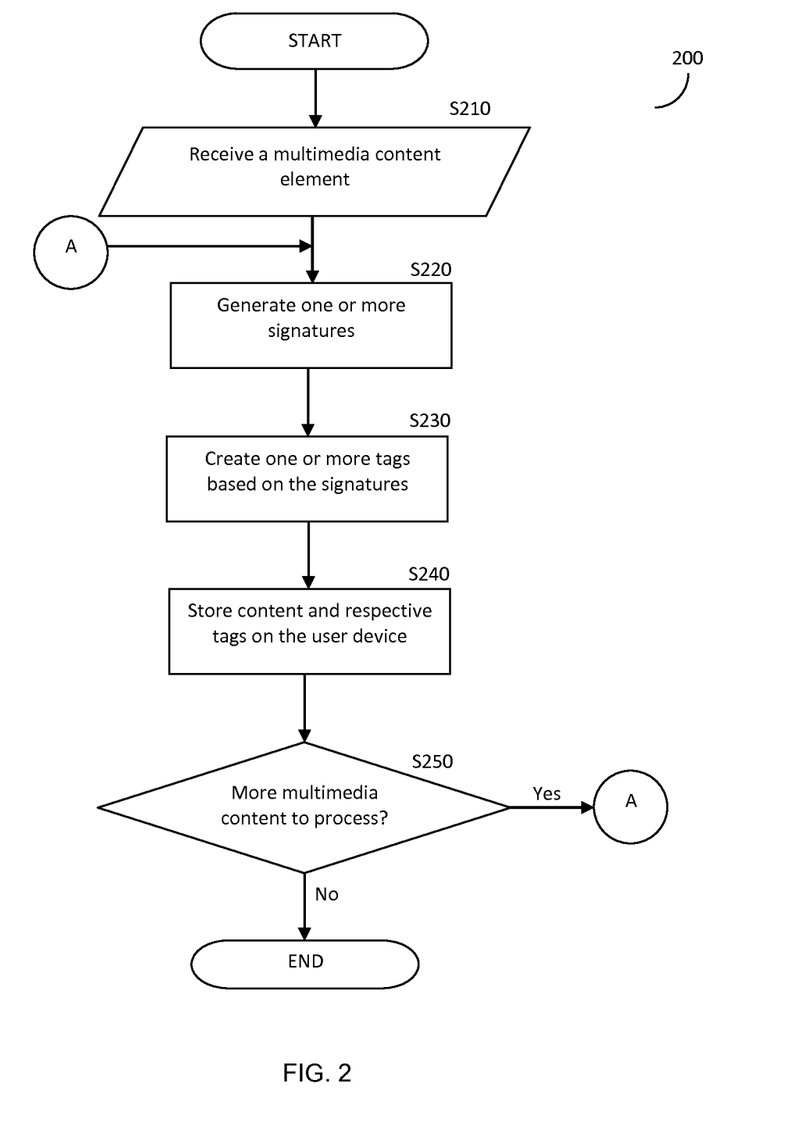
FIG. 2 is a flowchart describing the process of identifying multimedia content elements collected by a user device.

FIG. 2 depicts an exemplary and non-limiting flowchart 200 describing a method for tagging multimedia content elements according to an embodiment. At S210, at least one multimedia content element is received.

In S220, at least one signature is generated for the multimedia content element. The signature(s) are generated by a signature generator (e.g., SGS 140) as described below with respect to FIGS. 4 and 5.

In S230, at least one tag is created and assigned to the received multimedia content element based on generated signatures. According to one embodiment, S230 includes searching for at least one matching multimedia content element in the data warehouse 150 and using the tag of the matching content element to tag the received content element. Two signatures are determined to be matching if their respective signatures at least partially match (e.g., in comparison to a predefined threshold). According to another embodiment, S230 includes querying a DCC system with the generated signature to identify at least one matching concept structure. The metadata of the matching concept structure is used to tag the received multimedia element.

In S240, the multimedia content element together with its respective tags is sent to the user device to be stored locally on the user device. In addition, multimedia content element together with its respective tag(s) may be saved in a data warehouse (e.g., warehouse 150). In S250, it is checked whether received multimedia content elements have been processed, and if so, execution continues with S220 where a new element is selected for processing; otherwise, execution terminates.

Figure 3:
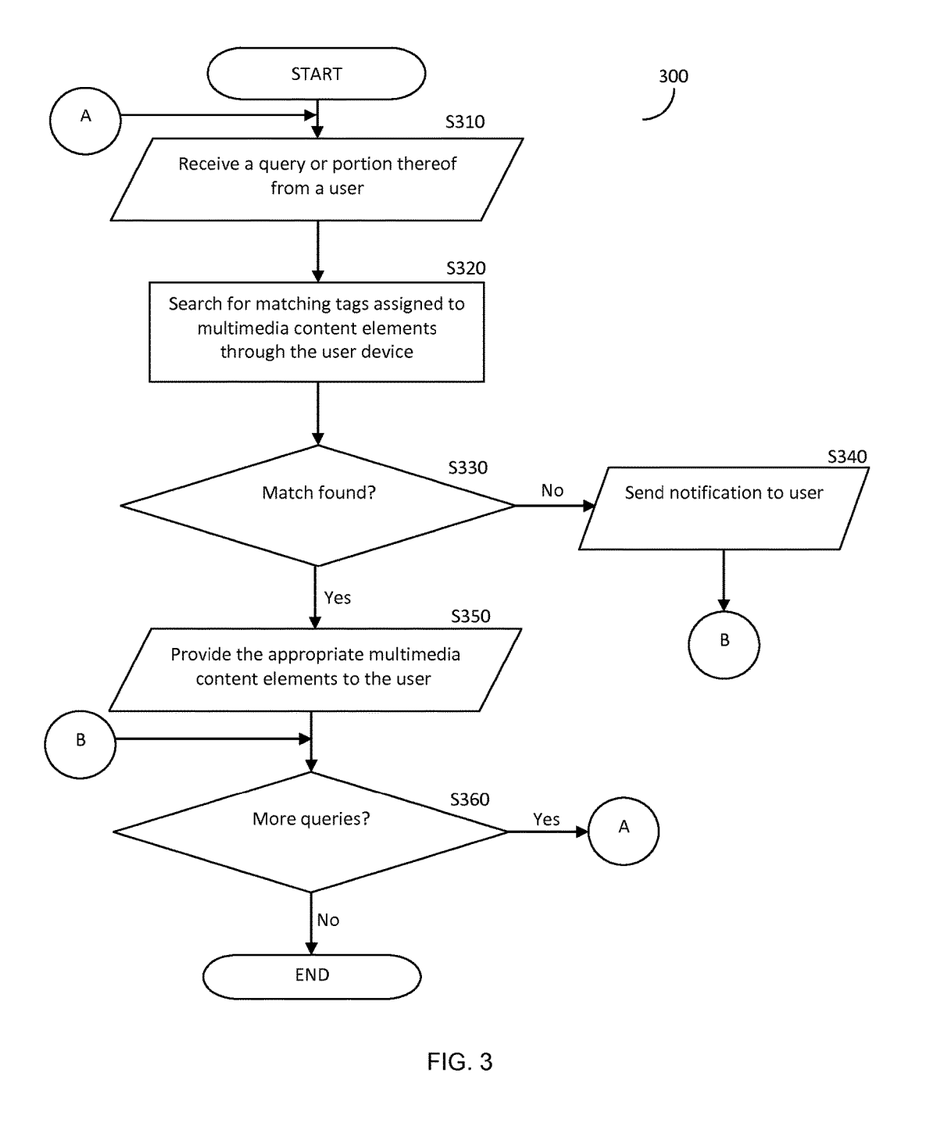
FIG. 3 is a flowchart describing the process of enhancing a user search experience through a user device according to an embodiment.

FIG. 3 depicts an exemplary and non-limiting flowchart 300 describing a method for enhancing a user search experience through a user device according to one embodiment. At S310, a search query or a portion thereof is attempted by a user of a user device, for example, the user device 120. According to one embodiment, when the user device is on-line in communication with the server 130, upon entering at least a portion of a query, the server 130 is configured to extract one or more suggested queries from the data warehouse 150 and provide them to the user device 120.

In S320, based on the query, a search is performed for appropriate multimedia content elements through the user device 120 based on a correlation between their assigned tags and the multimedia content elements. In S330, it is checked whether at least one related tag is identified, and if so execution continues with S350; otherwise, execution continues with S340 where a notification is sent to the user device that no matching tags were identified. Then execution terminates.

In S350, respective of the matching tags the appropriate multimedia content elements are displayed in the user device 120 as search results. In S360, it is checked whether there are additional queries and if so, execution continues with S310; otherwise, execution terminates.

Figure 4:
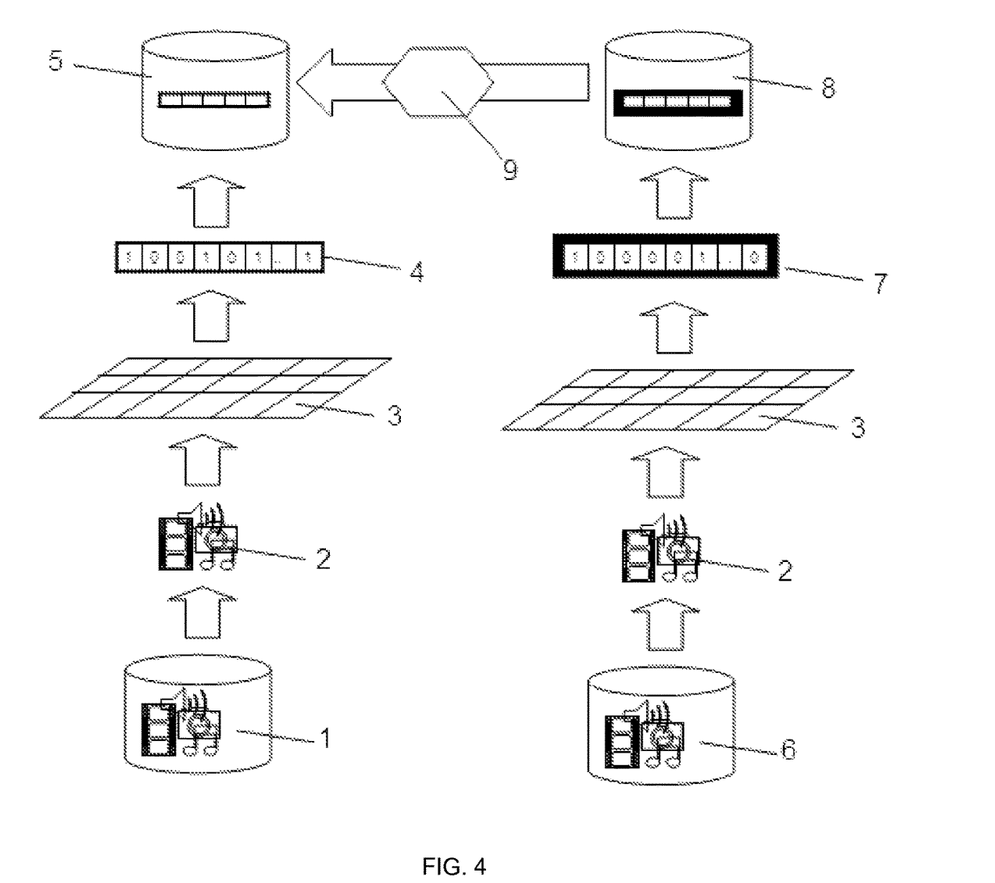
FIG. 4 is a block diagram depicting the basic flow of information in the signature generator system.
Figure 5:
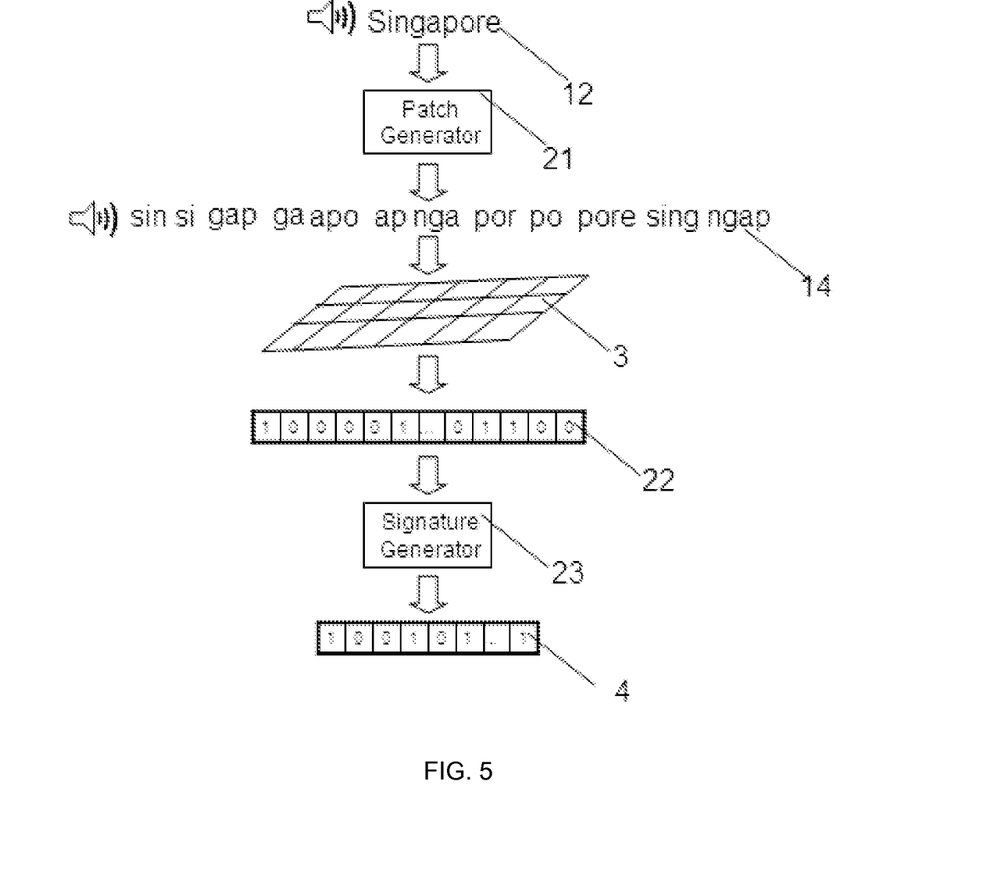
FIG. 5 is a diagram showing the flow of patches generation, response vector generation, and signature generation in a large-scale speech-to-text system.

FIGS. 4 and 5 illustrate the generation of signatures for the multimedia content elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment the server 130 is configured with a plurality of computational cores to perform matching between signatures.

The Signatures' generation process is now described with reference to FIG. 5. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}(1\leq i\leq L)$ may consist of a single leaky integrate-to-threshold unit (LTU) node or more nodes. The node $n_i$ equations are:

$$V_i = \sum_j w_{ij} k_j$$

$$n_i = \Box(Vi - Th_x)$$

where, ⊔ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
 $1-p(V>Th_S)-1-(1-\varepsilon)^l \ll 1$ i.e., given that l nodes (cores) constitute a Robust Signature of a certain image I, the probability that not all of these I nodes will belong to the Signature of same, but noisy image, $\tilde{.}$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the co-pending U.S. patent application Ser. No. 12/084,150 referenced above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for tagging multimedia content elements, comprising:
   receiving at least one multimedia content element from a user device;
   generating at least one signature for the at least one multimedia content element;
   generating at least one tag based on the at least one generated signature and at least one concept structure, wherein the at least one concept structure is a collection of signatures representing different multimedia content elements and metadata describing the concept structure, wherein the at least one tag is a textual term assigned to the at least one multimedia content element and is searchable by the user device; and
   sending the generated at least one tag to a storage on the user device.

2. The method of claim 1, wherein the at least one multimedia content element is at least one of: an image, graphics, a video stream, a video clip, an audio stream, an audio clip, a video frame, a photograph, images of signals, and portions thereof.

3. The method of claim 1, further comprising:
   searching a data warehouse for at least one multimedia content element that is similar to the at least one multimedia content element received from the user device, wherein an identification of the similar multimedia content element is performed based on the at least one signature generated for the at least one multimedia content element received from the user device and a signature of each multimedia content element stored in the data warehouse;
   extracting at least one tag associated with the at least one similar multimedia content element; and
   assigning the at least one extracted tag to the at least one multimedia content element received from the user device.

4. The method of claim 3, further comprising:
   providing a most descriptive tag based on the at least one extracted tag by performing any one of:
      correlating between tags of the at least one extracted tag; and
      selecting a tag associated with the at least one similar multimedia content element, wherein the respective signature of the selected tag matches the at least one multimedia content element received from the user device over a predefined threshold.

5. The method of claim 1, further comprising:
   querying a deep-content-classification (DCC) system to find a match between the at least one concept structure and the received at least one multimedia content element; and
   utilizing metadata associated with the at least one matching concept structure as the at least one tag.

6. The method of claim 5, further comprising:
   providing a most descriptive tag, wherein the most descriptive tag is determined based on the at least one extracted tag by correlation of matching concept structures.

7. The method of claim 1, wherein the at least one signature is generated for at least one portion of the received at least one multimedia content element.

8. A non-transitory computer readable medium having stored thereon instructions for causing one or more processing units to execute the method according to claim 1.

9. The method of claim 1, wherein the at least one signature is generated by a signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core.

10. A system for tagging multimedia content elements, comprising:
    a network interface for allowing connectivity to at least one user device and for receiving at least one multimedia content element from a user device;
    a processor; and
    a memory connected to the processor, the memory contains instructions that when executed by the processor, configure the system to:
       generate at least one signature for the at least one multimedia content element;
       generate at least one tag based on the at least one generated signature and at least one concept structure, wherein the at least one concept structure is a collection of signatures representing different multimedia content elements and metadata describing the at least one concept structure, wherein the at least one tag is a textual term assigned to the at least one multimedia content element and is searchable by the user device; and
       send the generated at least one tag to a storage on the user device.

11. The system of claim 10, wherein the at least one multimedia content element is at least one of: an image, graphics, a video stream, a video clip, an audio stream, an audio clip, a video frame, a photograph, and images of signals.

12. The system of claim 11, wherein the system is further configured to provide a most descriptive tag based on the at least one extracted tag.

13. The system of claim 10, wherein the system is further configured to:
    search a data warehouse for at least one multimedia content element that is similar to the at least one multimedia content element received from the user device, wherein an identification of the similar signature is performed based on the at least one signature generated for the at least one multimedia content element received from the user device and a signature of each multimedia content element stored in the data warehouse;
    extract at least one tag associated with the at least one similar multimedia content element; and
    assign the at least one extracted tag to the at least one multimedia content element received from the user device.

14. The system of claim 10, wherein the system is further configured to perform any one of: correlate between the at least one extracted tag, and select a tag associated with the at least one similar multimedia content element, wherein the respective signature of the selected tag matches the at least one multimedia content element received from the user device over a predefined threshold.

15. The system of claim 10, wherein the system is further configured to:
    query a deep-content-classification (DCC) system to find a match between the at least one concept structure and the received at least one multimedia content element; and utilize metadata associated with the at least one matching concept structure as the at least one tag.

16. The system of claim 15, wherein the system is further configured to correlate matching concept structures to provide a most descriptive tag based on the at least one extracted tag.

17. The system of claim 16, wherein the DCC system is communicatively connected to the system or included in the system.

18. The system of claim 10, wherein the generation of the at least one signature is made by a signature generator, wherein the at least one signature is generated for at least one portion of the at least one multimedia content element.

\* \* \* \* \*